(12) United States Patent
Weinstock (10) Patent No.: US 11,498,252 B2
(45) Date of Patent: Nov. 15, 2022

(54) WELL OR WELL STRIP AND METHOD FOR PRODUCING SAME

(71) Applicant: SARSTEDT AKTIENGESELLSCHAFT & CO.KG, Nümbrecht (DE)

(72) Inventor: Mark Weinstock, Helmenzen (DE)

(73) Assignee: SARSTEDT AKTIENGESELLSCHAFT & CO.KG, Nümbrecht (DE)

( * ) Notice: Subject to any disclaimer, the term of this patent is extended or adjusted under 35 U.S.C. 154(b) by 302 days.

(21) Appl. No.: 16/644,390

(22) PCT Filed: Aug. 30, 2018

(86) PCT No.: PCT/EP2018/073369
§ 371 (c)(1),
(2) Date: Mar. 4, 2020

(87) PCT Pub. No.: WO2019/048335
PCT Pub. Date: Mar. 14, 2019

(65) Prior Publication Data
US 2020/0262120 A1    Aug. 20, 2020

(30) Foreign Application Priority Data
Sep. 5, 2017 (DE) ............. 10 2017 215 528.0

(51) Int. Cl.
| B29C 45/27 | (2006.01) |
| B01L 3/00 | (2006.01) |
| B29C 45/33 | (2006.01) |
| B29C 45/44 | (2006.01) |
| B29L 31/00 | (2006.01) |

(52) U.S. Cl.
CPC ...... B29C 45/2708 (2013.01); B01L 3/50855 (2013.01); B29C 45/33 (2013.01); B29C 45/44 (2013.01); B01L 2200/12 (2013.01); B01L 2300/0858 (2013.01); B29L 2031/712 (2013.01)

(58) Field of Classification Search
CPC ........ B01L 3/50855; B01L 2300/0858; B01L 2200/12; B29C 45/44; B29C 45/2708; B29C 45/33; B29C 45/38; B29L 2031/712
See application file for complete search history.

(56) References Cited

U.S. PATENT DOCUMENTS

| 5,110,556 A | 5/1992 | Lyman et al. |
| 5,232,718 A | 8/1993 | Miyazawa et al. |
| 5,514,343 A | 5/1996 | Verwohlt et al. |

(Continued)

FOREIGN PATENT DOCUMENTS

| DE | 59110819 | 3/1996 |
| EP | 3688602 B1 | 5/2001 |

(Continued)

*Primary Examiner* — Monica A Huson
(74) *Attorney, Agent, or Firm* — Smartpat PLC (57) ABSTRACT

A method for producing a well or a well strip made of plastic, as used in the pharmaceutical industry in microtiter systems is presented. The wells typically have undercuts and the well strips are connected to each other by connecting ribs. In order to produce a well with a larger undercut height or a well strip with higher connecting ribs, as the case may be, the method provides that the plastic, which is initially still liquid, is pressed through a portion of a runner which is arranged in a slider and out of the slider into a cavity of an injection mold.

2 Claims, 6 Drawing Sheets

(56) References Cited

U.S. PATENT DOCUMENTS

| | | |
|---|---|---|
| 2001/0015512 A1 | 8/2001 | Fontana |
| 2005/0233363 A1 | 10/2005 | Harding et al. |
| 2010/0182597 A1 | 7/2010 | Sahiri et al. |
| 2013/0029343 A1 | 1/2013 | Day et al. |
| 2014/0112843 A1 | 4/2014 | Thomas et al. |
| 2015/0376562 A1 | 12/2015 | Baum et al. |

FOREIGN PATENT DOCUMENTS

| | | |
|---|---|---|
| GB | 2288233 B | 10/1998 |
| JP | 2005262781 | 9/2005 |
| SU | 1682195 A1 | 10/1991 |

WELL OR WELL STRIP AND METHOD FOR PRODUCING SAME

TECHNICAL FIELD

The disclosure relates to a method for producing at least one well, such as is used in the pharmaceutical industry in microtiter systems. Furthermore, the invention relates to a well or well strip produced by the method.

BACKGROUND

Microtiter systems and associated wells are generally known in the prior art, for example from European patent specification EP 0 688 602 B1.

The mentioned wells are made of plastic and are traditionally produced using an injection molding process. According to this, the production of such a well with an undercut on its outer side is carried out by means of an injection mold. This injection mold has a runner, injection-side components and at least one closing-side core for the well, a slider with slider elements and a scraper as closing-side components. To produce the well, such an injection mold is operated as follows:

First, the injection mold is closed by moving the closing-side components and the injection-side components towards each other, by which a cavity representing a negative mold for the well is formed in the injection mold between the slider elements. Thereupon, liquid plastic is pressed through the runner into the cavity with the assistance of an injection molding machine, in order to cure there. The well is created together with a sprue by the curing of the plastic. After curing, the injection mold is opened again by moving the closing-side components together with the well away from the injection-side components. Thereby, the sprue is torn off the well and the slider elements are moved apart in order to release the well with its undercuts. Finally, the well is stripped from the closing-side core with the assistance of the scraper, so that it is then available for removal from the injection mold.

The mentioned undercut on the outer side of a single well typically serves as a stop when inserting the well into an opening of a microtiter plate.

However, the known method described is not only used to produce a single well, but also to produce a well strip, with which several wells are connected to each other by connecting ribs. The near-bottom ends of the connecting ribs typically serve—similar to the undercuts with single wells—as a stop when inserting a well strip into the openings of a microtiter plate.

The height of the connecting ribs, measured in the longitudinal direction of a well, defines the strength and stiffness of a well strip. In other words, the height of the connecting ribs defines how easily or with difficulty individual wells can be broken off the well strip, or how easily or with difficulty a well strip breaks when bent around its transverse axis. There is a desire to make breakability more difficult, i.e. to produce well strips with higher connecting ribs.

However, the desire for the greatest possible piece height has its limits in terms of production technology. Such limits result, on the one hand, from the fact that the slider in the injection mold must always have a greater height than the undercut or the connecting ribs in order to be able to overlap them. On the other hand, the injection point of each well should be located on the side of the well just be-low the bottom, so that the cavity can be easily filled, and the well or well strip can be produced with a good quality.

With the known injection molds, the runner typically always runs in their injection-side components and opens from such injection-side components into the cavity. Given that the injection point, i.e. the mouth of the runner, is provided on the side of the cavity, the injection-side components of the known injection molds for wells necessarily extend—starting from the bottom of the wells—always a little bit be-yond the height of the wells. However, this means that—if the total height of a well or well strip is fixed—only the remaining part of the total height of the well, not the total height, is available as the height for the slider. However, since, as already mentioned, the slider must overlap the undercuts or the connecting ribs from their height, the traditional method described above is only suitable for the pro-duction of wells with a limited undercut height or well strips with a limited height of the connecting ribs.

SUMMARY

The invention is based on the task of further developing a known method for producing at least one well made of plastic with an undercut with the assistance of an injection mold, in such a manner that a well with a larger undercut height can also be produced, or that well strips with higher connecting ribs can also be produced.

This task is solved by the method as claimed. This method is benefits from the fact that the liquid plastic is pressed through a portion of the runner in the slider and out of the slider into the cavity.

The method provides for the use of injection molds, with which the last portion of the runner is not formed in the injection-side components, but in the slider, and that the runner opens into the cavity from there. This offers the advantage that the slider can be built significantly higher than in the prior art and that, due to the greater installation height of the slider, wells with—compared to the prior art—higher undercuts or well strips with higher connecting ribs can also be produced with the claimed method, in each case by way of example related to the total height of a well or well strip. Advantageously, the well strips produced in this manner are less easily breakable.

Figure 1A:
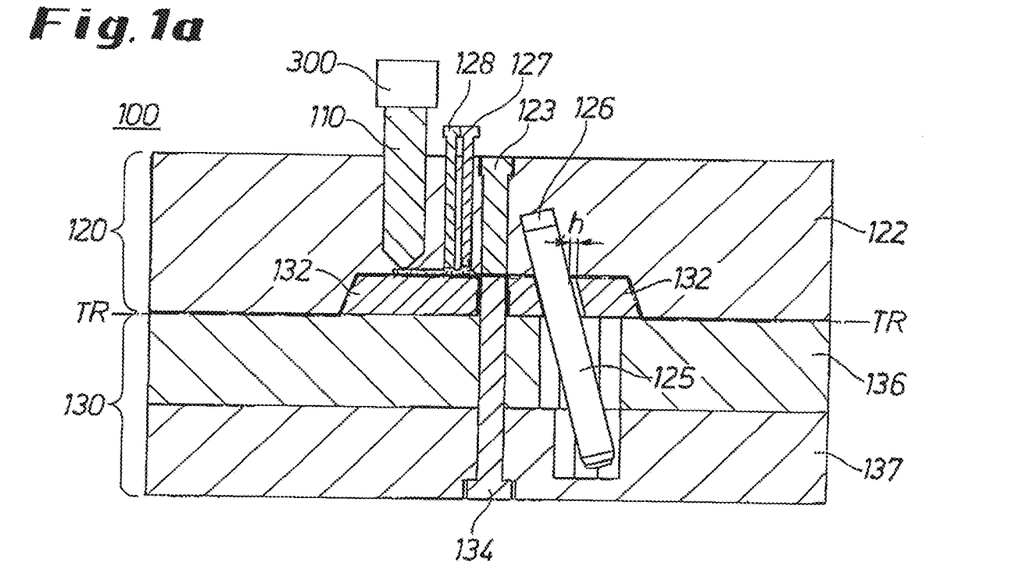
FIG. 1a shows the starting point of the method in the form of a closed injection mold.

With the present description, the terms "up, above, down, below" always refer to the arrangements shown in the figures or to the dividing line between the injection-side and closing-side components of the injection mold shown in FIG. 1. The injection-side and the closing-side components typically, but not necessarily, move towards or away from each other along the longitudinal direction of the cavity relative to each other. The slider elements typically, but not necessarily, move relative to each other transversely to such longitudinal axis.

In accordance with a first exemplary embodiment of the method, when the injection mold is opened the slider elements are moved apart only after the sprue has been torn off the well along the longitudinal axis by moving the injection-side and closing-side components apart, and pulled out of the portion of the runner in the slider. Only this claimed delay between the transverse movement of the slider elements and the moving part of the injection-side and closing-side components in the direction of the longitudinal axis ensures that the part of the sprue located in the portion of the runner in the slider is pulled out there. Without the claimed delay, i.e. if the slider elements and the injection-side and closing-side components were to move apart at the same time, the part of the sprue located in the slider would be sheared off by the part of the sprue located outside the slider. It would then be impossible to remove the part of the sprue remaining in the slider from the portion of the runner located there and thus to repeat the method to produce further wells or well strips.

It is advantageous to use the method in accordance with the invention to produce wells, undercuts of which have a height of, for example, between 3.5 and 10 mm, preferably between 7.0 and 10 mm. The same height range specifications apply to the connecting ribs between two adjacent wells with a well strip.

The above-mentioned task of the invention is further achieved by a well or a well strip that is produced by the method. The advantages of these solutions correspond to the advantages mentioned above with regard to the claimed method.

The wells may have at least one recess on their outer side, wherein the recess is intended in particular for releasable locking of the wells in the opening of a microtiter plate. In the case of individual wells, the recesses can be in the height range of the undercut or outside the undercut. In the case of well strips, the recesses of the individual wells can be formed in the height range of the connecting ribs or outside the connecting ribs.

The recesses are typically in the form of a groove running all the way around the outer side of the wells, or at least in sections.

Upper or lower boundary walls of the recesses can be beveled or rounded. A rounded design facilitates the removal of the wells or well strips from the locking in a microtiter plate.

BRIEF DESCRIPTION OF THE DRAWINGS

FIG. 1b shows a detailed view of FIG. 1a.
FIG. 2b shows a detailed view of FIG. 2a.
FIG. 3b shows a detailed view of FIG. 3a.

DETAILED DESCRIPTION

The invention is described in detail in the following with reference to the figures mentioned in the form of exemplary embodiments. In all figures, the same technical elements are marked with the same reference signs.

Figure 1B:
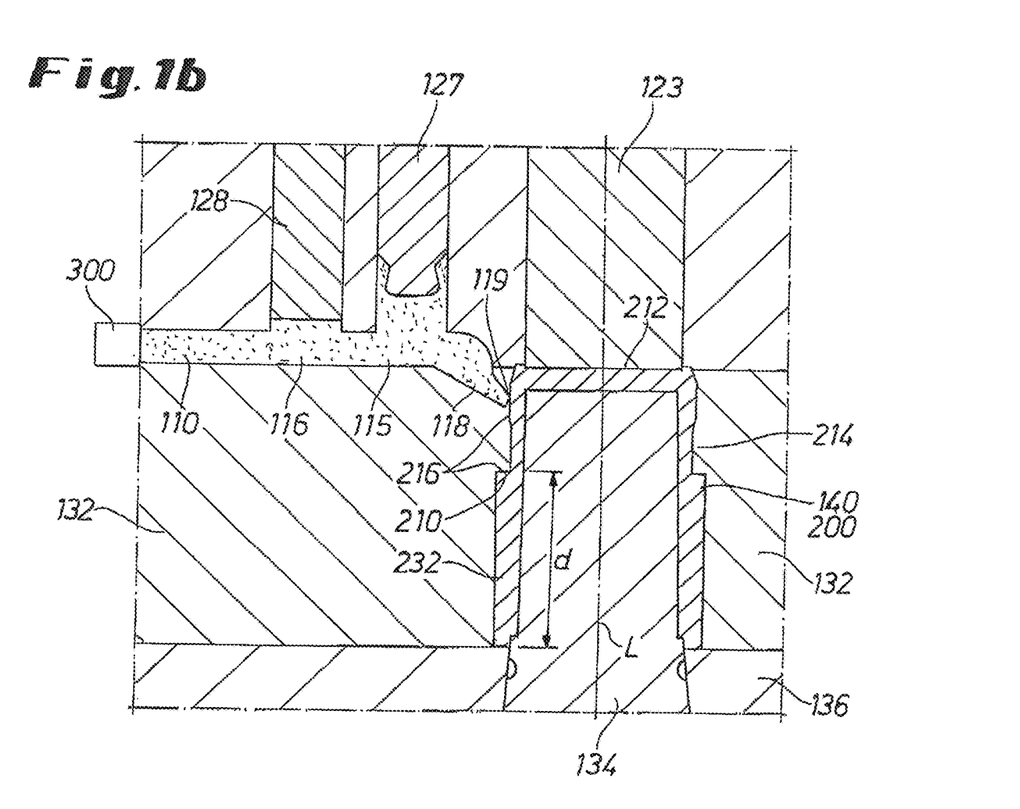

FIGS. 1a and 1b show the injection mold 100 used in the method in a closed state. That is, its injection-side and closing-side components 120, 130 must move towards each other. In the exemplary embodiment shown in FIGS. 1a and 1b, the injection-side components 120 above the dividing line TR include a slider plate 122 with an injection-side core 123 embedded therein for a well 200 to be produced. Furthermore, a first portion 116 of the runner 110 is formed in the slider plate 122. In addition, the injection-side components 120 also include, for example, a slanted bolt 125, which is fixed in a slanted blind hole 126 in the slider plate 122.

In addition to such injection-side components 120, the injection mold 100 also includes the following closing-side components: A scraper 136, by way of example designed in the form of a scraper plate, and a closing-side core 134 for the well 200, which is displaceably mounted in the scraper. The scraper 136 has an opening for receiving the slanted bolt 125 with a predetermined clearance or free stroke h. Two slider elements 132 or slider halves are mounted on the scraper 136 so that they can be displaced transversely to the longitudinal direction L. The closing-side core 134 for the well 200 is held at its well end by a core retaining plate 137.

With the closed state of the injection mold 100 shown in FIGS. 1a and 1b, the closing-side and injection-side components 120, 130 are to be moved towards each other so far that they touch. In particular, the slider elements 132 touch the slider plate 122. Between the slider elements 132—and further limited by the clamp-side core 123 and the injection-side core 134—a cavity 140 is formed in the closed injection mold, which represents a negative mold for the well 200 to be produced.

In addition to the first portion 116 of the runner 110, shown here only as an example as formed in the slider plate 122, a second portion 118 of the runner is visible in the slider 132, which opens into the cavity 140. The slanted bolt 125 does not prevent the injection mold 100 from closing, because its free end protrudes into openings in the slider elements 132, in the scraper 136 and possibly also in the core retaining plate 137.

The method for producing at least one well or well strip made of plastic with an undercut on its outer side comprises the following steps:

After closing the injection mold 100, the cavity 140 formed in it is filled with liquid plastic. Specifically, the liquid plastic is initially formed on the injection side with the assistance of an injection molding machine 300, first through the first portion 116 of the runner 110, in FIGS. 1a and 1b as an example, then through a second portion 118 of the runner in the slider 132 and from there pressed into the cavity 140. In FIG. 1b, the two portions of the runner are clearly visible. It is also clearly visible that the injection point 119 is located on the side of the well 200 or cavity 140, as the case may be, below the bottom 212 of the well.

The plastic then cures in the cavity 140 and the runner 110; in the well, this leads to the formation of the well 200 and in the two portions 116 and 118 of the runner, the curing of the plastic leads to the formation of the sprue 115. The well 200 and the sprue 115 are initially formed in one piece with each other.

Figure 2A:
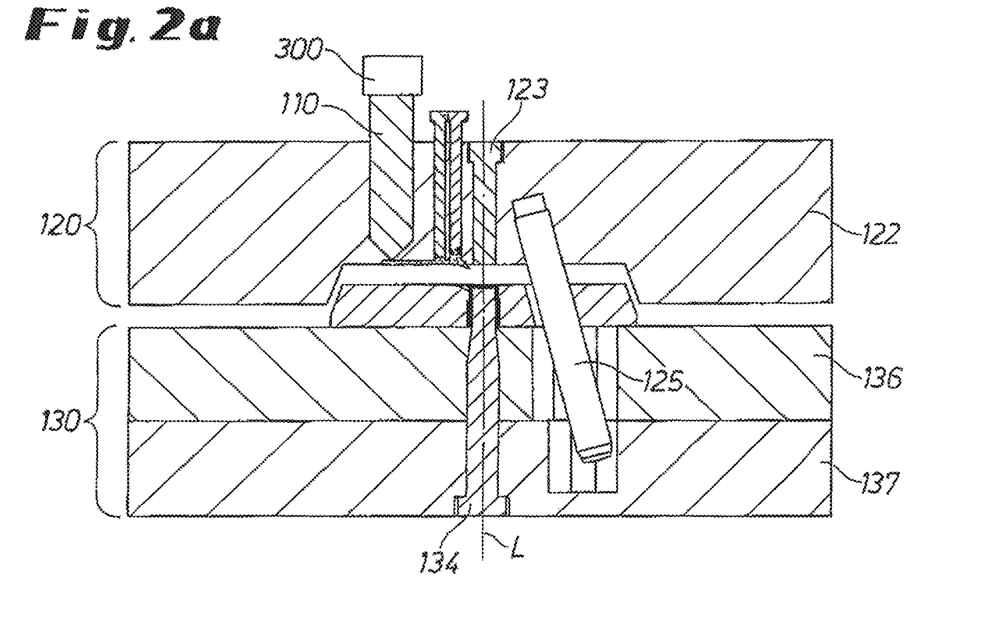
FIG. 2a shows a first step of the method.
Figure 2B:
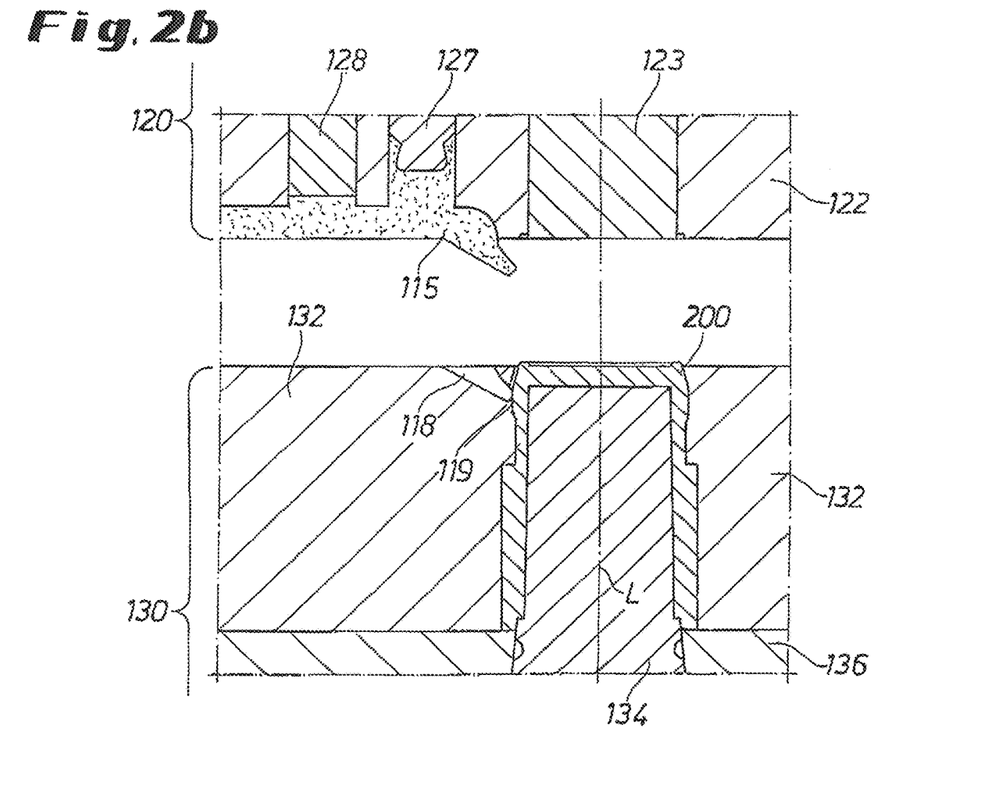

In a subsequent method step, as shown in FIGS. 2a and 2b, the closing-side components 130 and the injection-side components 120 are moved apart along the longitudinal axis L, as an example. The well 200 breaks away from the sprue 115 at the injection point 119. Thereby, the sprue 115 is pulled out of the second portion 118 of the runner 110 and initially remains in the first portion 116 of the runner 110 on the injection molding side. There, the sprue 115 is held by a sprue retaining pin 127 with the assistance of the undercuts shown in FIG. 2b.

Figure 3A:
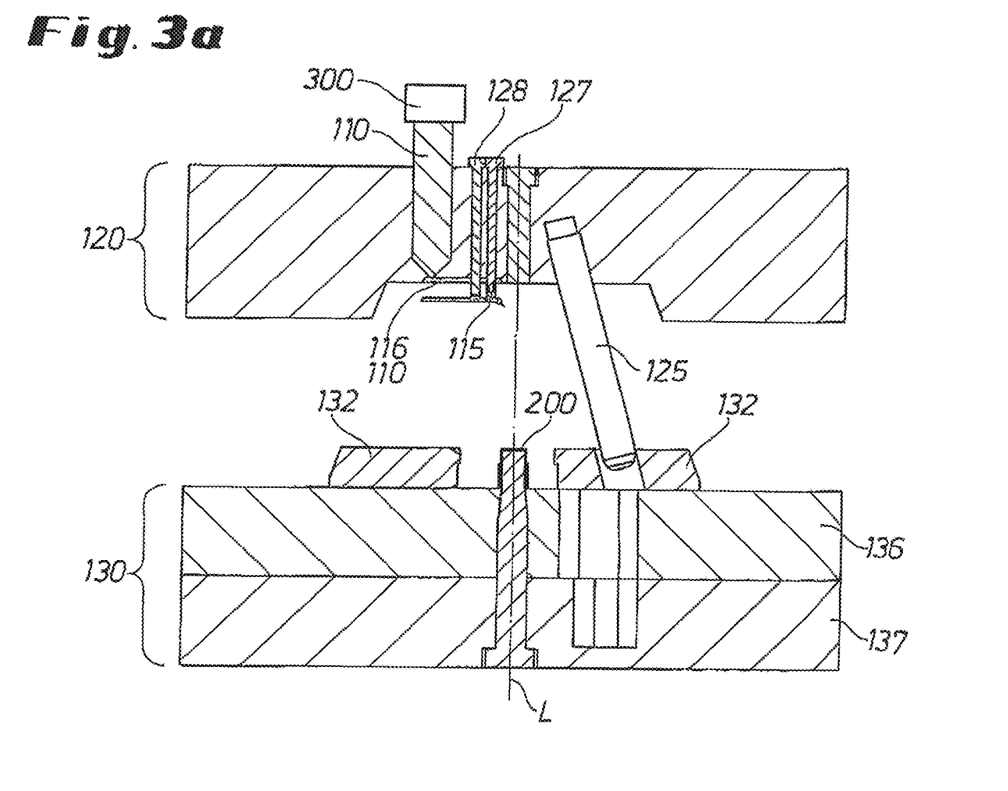
FIG. 3a shows a second step of the method.
Figure 3B:
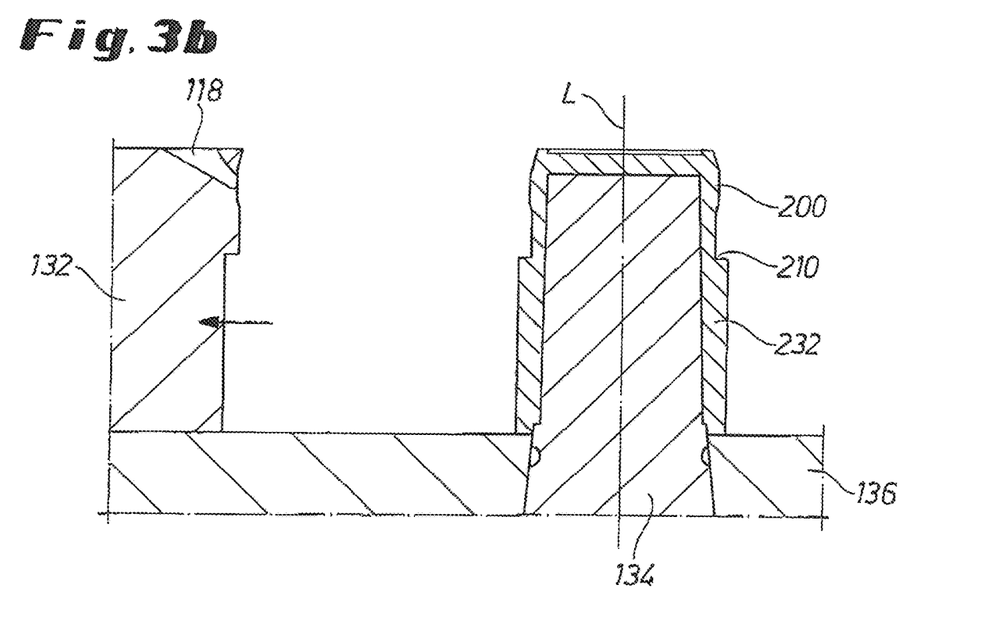

FIGS. 3a and 3b illustrate the following method step, according to which only after the sprue 115 has been torn off from the slider 132 are the slider elements 132 on both sides of the well 200 moved apart on the scraper 136 or the scraper plate, as the case may be, transversely to the longitudinal direction L. The moving apart takes place in order to release the well 200 with its undercuts 210 or the well strip 200', as the case may be, with its connecting ribs 232 for a subsequent ejection.

FIG. 3b shows that the well-side contour of the slider elements 132 is complementary to the outer contour of the well 200.

An overview of FIGS. 1a, 2a and 3a shows how the relative position of the slanted bolt 125, which is clamped in a fixed manner in the slider plate 122, changes within the openings of the slider elements 132, the scraper 136 and possibly also in the core retainer plate 137 as the injection-side and the closing-side components 120, 130 are increasingly moved apart. In FIGS. 1a and 2a, the relative position changes in each case; however, there is no displacement of the slider elements 132 in particular, because the slanted bolt 125 still moves within the free stroke h allowed to it in the opening of the slider elements. Only when the closing-side and injection-side components 120, 130 have been moved apart in the longitudinal direction L as far as shown in FIG. 2a, the free stroke h is used up and, as the components 120, 130 continue to move apart in the longitudinal direction L, due to the slanted position of the slanted bolt 125, the transverse dis-placement of the slider elements 132 occurs and thus the opening of the cavity 140 occurs, as shown in FIG. 3a.

It is important that the mentioned moving apart of the slider elements 132 is not carried out at the beginning of the moving apart of the components 120, 130, because this would lead to an undesired shearing of the part of the sprue located in the second portion 118 of the runner from the part of the sprue located in the first portion 116. Such a shearing is undesirable, because, at that point, the part of the sprue 115 remaining in the slider could no longer be removed from the second portion 118 of the runner.

To avoid this, the mentioned (time) delay between the moving apart of the components 120, 130 and the moving apart of the slider elements 132 is particularly important. Of course, the mentioned delay can also take place differently than by the slanted bolt 125 shown here by way of example. In principle, any other mechanical, hydraulic or electronic solutions are conceivable.

Furthermore, it can be seen in FIG. 3a that the sprue 115 was pushed out of the first portion 116 of the runner with the help of a sprue ejector pin 128. However, it is still held by the sprue retaining pin 127.

Figure 4:
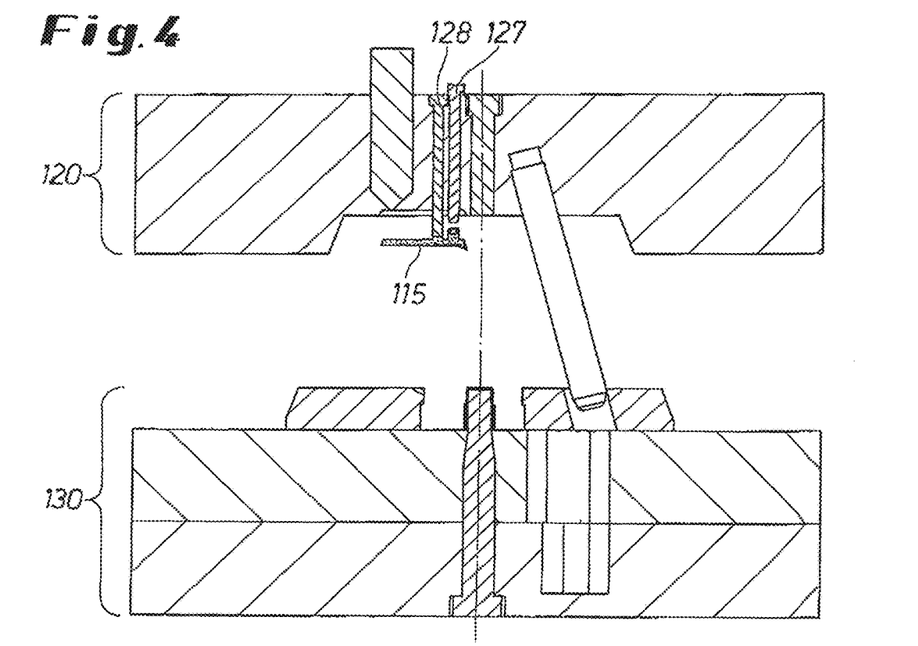
FIG. 4 shows a third step of the method.

FIG. 4 shows the next method step, in which the sprue retaining pin 127 is separated from the sprue 115 by pulling it upwards from the sprue 115, while the sprue 115 is simultaneously held in its ejection position by the sprue ejector pin 128.

Figure 5:
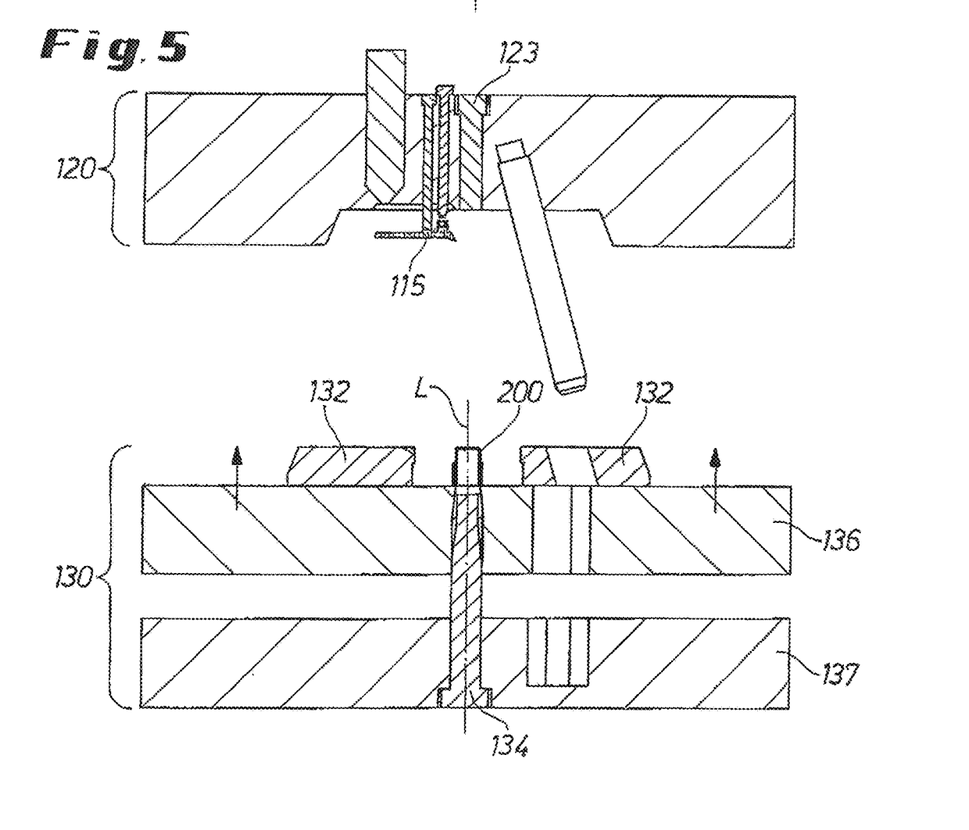
FIG. 5 shows a fourth step of the method.

FIG. 5 shows a final method step, according to which the well 200 is stripped off the core 134 on the closing-side. As shown in FIG. 5, this is done by moving the scraper 136 or the scraper plate, as the case may be, upwards in the longitudinal direction L relative to the core retaining plate 137. The edge of the opening for the closing-side core 134 in the scraper 136 is designed in such a manner that it engages the opening edge of the well 200 from below and thus strips the well 200 off the closing-side core 134 as it moves in the longitudinal direction L up-wards. Both the sprue 115 and the well 200 are subsequently ejected from the injection mold.

Figure 6:
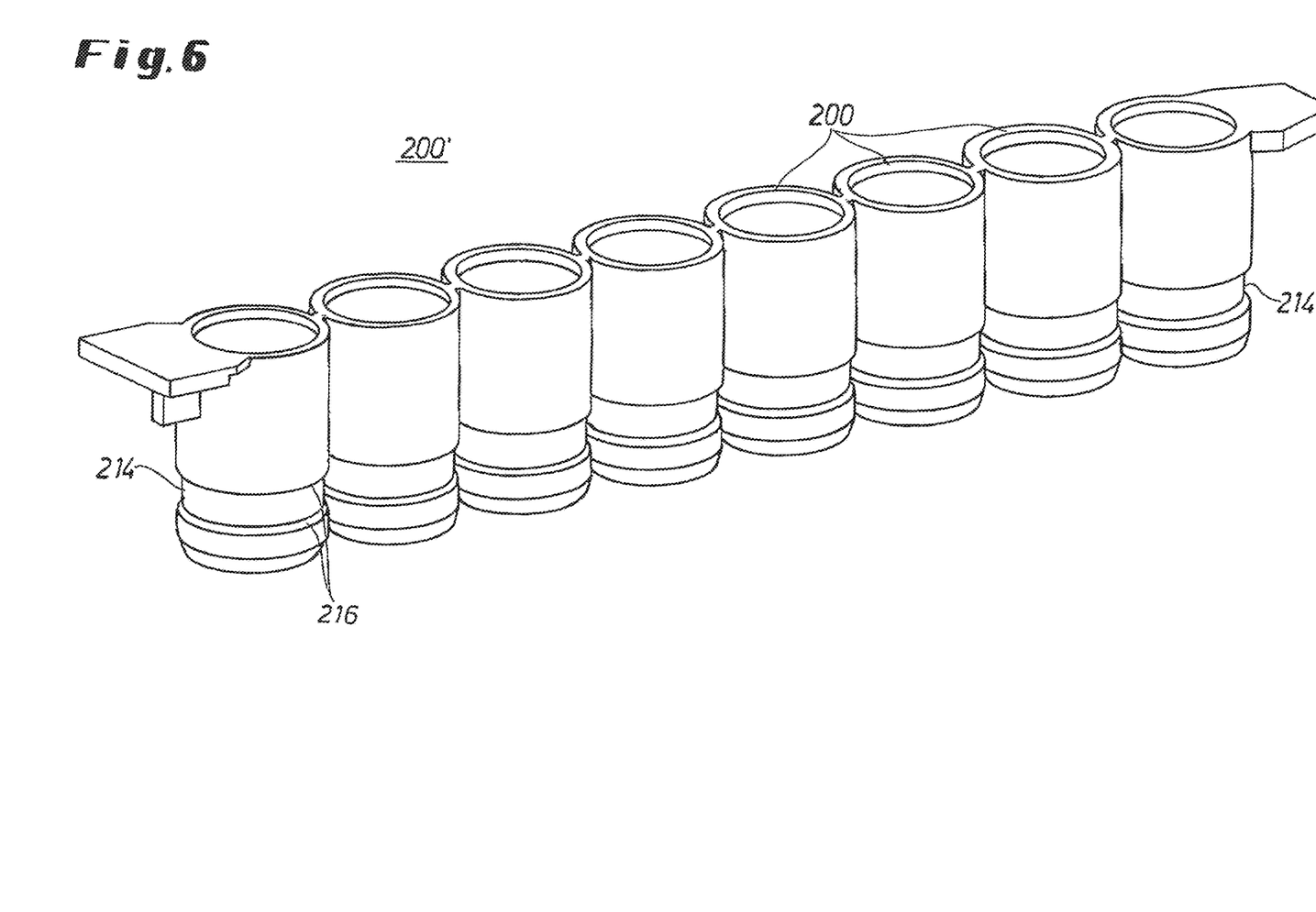
FIG. 6 shows a well strip produced by the method.

FIG. 6 shows an example of a well strip 200' produced according to the method in accordance with the invention. It consists of a plurality of individual wells 200 arranged in a line adjacent to each other. Recesses 214 can be seen on the outer side of the wells; these are used to snap the wells 200 or the well strip 200' into the openings of a microtiter plate. The recesses here are, by way of example, de-signed in the form of a circumferential groove. Each of the upper and lower boundary walls 216 of the recess 214 can be formed to be straight or, as shown in FIG. 6, beveled or rounded.

Figure 7:
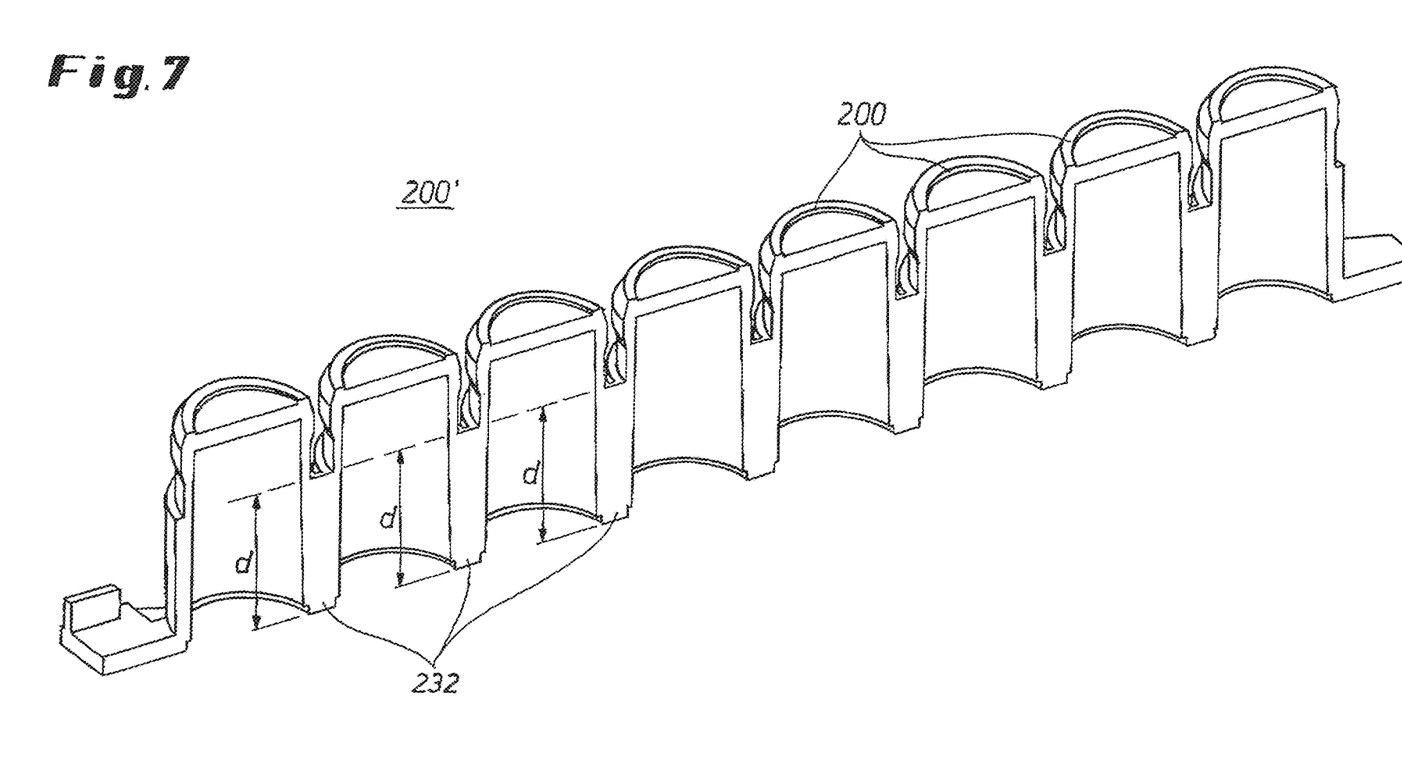
FIG. 7 shows a longitudinal section through the well strip according to FIG. 6.

FIG. 7 shows a longitudinal section through the well strip 200'. The connecting ribs 232, with which the individual wells 200 are connected to each other, are particularly easily visible here. Each of such connecting ribs has a height d. Only the method in accordance with the invention makes it possible to form this piece height in a height range of 3.5 mm<d<10 mm, preferably 7.0 mm<d<10 mm, each measured from the edge of the openings of the wells 200.

LIST OF REFERENCE SIGNS

100 Injection mold
110 Runner
115 Sprue
116 First portion of the runner
118 Second portion of the runner
119 Injection point
120 Injection-side component
122 Slider plate
123 Injection-side core
125 Slanted bolt
126 Blind hole
127 Sprue retaining pin
128 Sprue ejector pin
130 Closing-side components
132 Slider/slider element
134 Closing-side core
136 Scraper
137 Core retaining plate
140 Cavity
200 Well
200' Well strip
210 Undercut
212 Bottom of the well
214 Recess
216 Boundary walls
230 Well strip
232 Connecting ribs
300 Injection molding machine
L Longitudinal direction
TR Dividing line
h Free stroke
d Height of the connecting ribs

The invention claimed is:

1. A method for producing a well strip (230) having a plurality of wells (200) which are connected to one another by connecting ribs (232), the wells having an undercut (210) on their outer side, with an injection mold (100) having
   a runner (110),
   injection-side components (120), and
   closing-side components (130) including
      at least one slider (132) with slider elements (132),
      a closing-side core (134) and
      a scraper (136),
   comprising the following steps:
   closing the injection mold (100) by moving the closing-side components (130) and the injection-side components (120) towards each other relative to each other, by which a cavity (140) representing a negative mold for the wells (200) is formed in the injection mold (100) between the slider elements (132);
   pressing liquid plastic with the assistance of an injection molding machine (300) through a portion (118) of the runner (110) in the slider (132) and from the slider (132) into the cavity (140), wherein an injection point (119) is arranged on a side of the wells respectively on a side of the cavity (140) below a bottom of the wells;

allowing the plastic in the cavity (140) to cure and form the wells (200) together with a sprue (115);

opening the injection mold (100) by moving apart the closing-side components (130) together with the wells (200) and the injection-side components (120) relative to each other, wherein the sprue (115) is torn off the wells (200), and wherein the slider elements (132) are moved apart to release the undercut (210) on the well (210) only after the sprue (115) has been torn off the wells (200) and pulled out of the portion (118) of the runner (110) in the slider (132); and stripping the well strip (230) from the closing-side core (134) with the help of the scraper (136);

wherein the undercut (210) or the connecting ribs (232) have a height (d) in a longitudinal direction (L) of the wells for which the following applies:
3.5 mm<d<10 mm.

2. The method as in claim 1, wherein 7.0 mm<d<10 mm.

\* \* \* \* \*